(12) United States Patent
Ota et al.

(10) Patent No.: US 7,616,645 B2
(45) Date of Patent: Nov. 10, 2009

(54) FRAME FORWARDING APPARATUS FOR CONVERTING VLAN IDENTIFIERS

(75) Inventors: Migaku Ota, Yokohama (JP); Hiroaki Miyata, Yokohama (JP); Masahiro Kimura, Fujisawa (JP); Jun Nakajima, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 506 days.

(21) Appl. No.: 11/482,100

(22) Filed: Jul. 7, 2006

(65) Prior Publication Data

US 2007/0171918 A1    Jul. 26, 2007

(30) Foreign Application Priority Data

Jan. 26, 2006 (JP) ............................. 2006-017090

(51) Int. Cl.
    H04L 12/56    (2006.01)
    H04L 12/28    (2006.01)
(52) U.S. Cl. .................. 370/395.53; 370/389; 370/390; 370/359; 709/227; 709/249
(58) Field of Classification Search .................. 370/389, 370/359, 390; 709/249, 218, 220
    See application file for complete search history.

(56) References Cited

U.S. PATENT DOCUMENTS 5,802,047 A * 9/1998 Kinoshita .................... 370/359
6,912,592 B2 * 6/2005 Yip .............................. 709/249
6,967,949 B2 * 11/2005 Davis et al. .................. 370/390
2004/0032868 A1 * 2/2004 Oda et al. .................... 370/389
2004/0078469 A1 * 4/2004 Ishwar et al. ................ 709/227
2007/0104192 A1 * 5/2007 Yoon et al. ................... 370/389

FOREIGN PATENT DOCUMENTS

JP    2003-244185    8/2003

OTHER PUBLICATIONS

McPherson, D., et al. "VLAN Aggregation for Efficient IP Address Allocation" RFC 3069, Feb. 2001, pp. 1-7.

* cited by examiner

*Primary Examiner*—Dang T Ton
*Assistant Examiner*—Mohamed Kamara
(74) *Attorney, Agent, or Firm*—McDermott Will & Emery LLP

(57) ABSTRACT

A frame forwarding apparatus is provided with a frame forwarding processing unit for converting a VLAN ID of a frame received from one subscriber terminal into a group VLAN ID and converting a group VLAN ID of a frame received from an ISP router into a subscriber VLAN ID, by referring to a VLAN bundling table. Each of the entries in the bundling table defines subscriber side line information including a line number of a physical line connected to one of the subscriber terminals and a subscriber VLAN ID, in association with a MAC address of the subscriber terminal and ISP router side line information including a line number of a physical line connected to the ISP router and a group VLAN ID.

9 Claims, 20 Drawing Sheets

FIG. 3

LINE INFORMATION TABLE 17

| PHYSICAL LINE NUMBER ~171 | SUBSCRIBER SIDE CONNECTION FLAG ~172 | ISP SIDE CONNECTION FLAG ~173 |
|---|---|---|
| L1 | 0 | 1 |
| L2 | 1 | 0 |
| ⋮ | ⋮ | ⋮ |

FIG. 4

VLAN BUNDLING TABLE 18

| SUBSCRIBER SIDE LINE INFORMATION ~181 | | ISP SIDE LINE INFORMATION ~182 | | MAC ADDRESS ~183 | AGING BIT ~184 | TIME STAMP ~185 | |
|---|---|---|---|---|---|---|---|
| PHYSICAL LINE NUMBER 181A | VLAN ID 181B | PHYSICAL LINE NUMBER 182A | VLAN ID 182B | | | | |
| L2 | 1 | L1 | 1 | MAC1 | 1 | 10101 | ~EN-1 |
| L2 | 2 | L1 | 1 | MAC2 | 1 | 15390 | ~EN-2 |
| L2 | 3 | L1 | 1 | MAC3 | 0 | 10452 | ~EN-3 |
| ⋮ | ⋮ | ⋮ | ⋮ | ⋮ | ⋮ | ⋮ | |

FIG. 10

VLAN BUNDLING TABLE 18

| SUBSCRIBER SIDE LINE INFORMATION | | ISP SIDE LINE INFORMATION | | MAC ADDRESS | AGING BIT | TIME STAMP | |
|---|---|---|---|---|---|---|---|
| PHYSICAL LINE NUMBER | VLAN ID | PHYSICAL LINE NUMBER | VLAN ID | | | | |
| L2 | 1 | L1 | 1 | MAC1 | 1 | 10101 | ← EN-21 |
| | | | | MAC2 | 1 | 15390 | ← EN-22 |
| | | | | MAC3 | 0 | 10452 | ← EN-23 |
| L3 | 1 | L1 | 2 | MAC4 | 0 | 12395 | ← EN-31 |
| | | | | MAC5 | 0 | 18490 | ← EN-32 |
| | | | | MAC6 | 1 | 19546 | ← EN-33 |
| L4 | 1 | L1 | 3 | MAC7 | 1 | 14567 | ← EN-41 |
| | | | | MAC8 | 0 | 13258 | ← EN-42 |
| | | | | MAC9 | 1 | 17567 | ← EN-43 |
| ... | ... | ... | ... | ... | ... | ... | |

ROUTING TABLE 21

| NETWORK DESTINATION/ NETMASK | OUTPUT LINE INFORMATION | | NEXT HOP |
|---|---|---|---|
| | PHYSICAL LINE NUMBER | VLAN ID | |
| 10.10.2.0/24 | L1 | 1 | DIRECT |
| 10.10.3.0/24 | L1 | 2 | DIRECT |
| 10.10.4.0/24 | L1 | 3 | DIRECT |
| ⋮ | ⋮ | ⋮ | ⋮ |
| DEFAULT | L6 | — | 10.10.6.254 |

ARP TABLE 22

| IP ADDRESS | MAC ADDRESS |
|---|---|
| 10.10.2.2 | MAC1 |
| 10.10.2.3 | MAC2 |
| 10.10.2.4 | MAC3 |
| 10.10.3.2 | MAC4 |
| 10.10.3.3 | MAC5 |
| 10.10.3.4 | MAC6 |
| 10.10.4.2 | MAC7 |
| 10.10.4.3 | MAC8 |
| 10.10.4.4 | MAC9 |
| ⋮ | ⋮ |
| 10.10.6.254 | MAC100 |

VLAN BUNDLING TABLE 18

| SUBSCRIBER SIDE LINE INFORMATION 181 | | ISP SIDE LINE INFORMATION 182 | | MAC ADDRESS 183 | AGING BIT 184 | TIME STAMP 185 | |
|---|---|---|---|---|---|---|---|
| PHYSICAL LINE NUMBER | VLAN ID | PHYSICAL LINE NUMBER | VLAN ID | | | | |
| L2 | 1 | L1 | 1 | MAC1 | 1 | 10101 | ∼ EN-21 |
| L2 | 2 | | | MAC2 | 1 | 15390 | ∼ EN-22 |
| L2 | 3 | | | MAC3 | 0 | 10452 | ∼ EN-23 |
| L3 | 1 | L1 | 2 | MAC4 | 0 | 12395 | ∼ EN-31 |
| | | | | MAC5 | 0 | 18490 | ∼ EN-32 |
| | | | | MAC6 | 1 | 19546 | ∼ EN-33 |
| L4 | 1 | L1 | 3 | MAC7 | 1 | 14567 | ∼ EN-41 |
| | | | | MAC8 | 0 | 13258 | ∼ EN-42 |
| | | | | MAC9 | 1 | 17567 | ∼ EN-43 |
| ... | ... | ... | ... | ... | ... | ... | |
| 181A | 181B | 182A | 182B | | | | |

VLAN BUNDLING TABLE 18

| SUBSCRIBER SIDE LINE INFORMATION | | ISP SIDE LINE INFORMATION | | MAC ADDRESS | AGING BIT | TIME STAMP | |
|---|---|---|---|---|---|---|---|
| PHYSICAL LINE NUMBER | VLAN ID | PHYSICAL LINE NUMBER | VLAN ID | | | | |
| L2 | 1 | L1 | 1 | MAC1 | 1 | 10101 | ← EN-21 |
| | | | | MAC2 | 1 | 15390 | ← EN-22 |
| | | | | MAC3 | 0 | 10452 | ← EN-23 |
| L3 | 1 | L1 | 1 | MAC4 | 0 | 12395 | ← EN-31 |
| | | | | MAC5 | 0 | 18490 | ← EN-32 |
| | | | | MAC6 | 1 | 19546 | ← EN-33 |
| L4 | 1 | L1 | 3 | MAC7 | 1 | 14567 | ← EN-41 |
| | | | | MAC8 | 0 | 13258 | ← EN-42 |
| | | | | MAC9 | 1 | 17567 | ← EN-43 |
| ... | ... | ... | ... | ... | ... | ... | |

VLAN BUNDLING TABLE 18A

| SUBSCRIBER SIDE LINE INFORMATION 181 | | ISP SIDE LINE INFORMATION 182 | | MAC ADDRESS 183 | AGING BIT 184 | TIME STAMP 185 |
|---|---|---|---|---|---|---|
| PHYSICAL LINE NUMBER 181A | VLAN ID 181B | PHYSICAL LINE NUMBER 182A | VLAN ID 182B | | | |
| L2 (EN20) | 1 | L1 | 1 | MAC1 | 1 | 10101 |
| L3 (EN30) | 1 | L1 | 2 | MAC2 | 1 | 12345 |
| L4 (EN40) | 1 | L1 | 3 | MAC3 | 0 | 15964 |
| | | | | MAC4 | 0 | 12395 |
| | | | | MAC5 | 0 | 18972 |
| | | | | MAC6 | 1 | 14554 |
| | | | | MAC7 | 1 | 15976 |
| | | | | MAC8 | 0 | 11354 |
| | | | | MAC9 | 1 | 17889 |
| ... | ... | ... | ... | ... | ... | ... |

FIG. 19

VLAN BUNDLING TABLE 18B

| SUBSCRIBER SIDE LINE INFORMATION 181 | | ISP SIDE LINE INFORMATION 182 | | MAC ADDRESS 183 | AGING BIT 184 | TIME STAMP 185 |
|---|---|---|---|---|---|---|
| PHYSICAL LINE NUMBER 181A | VLAN ID 181B | PHYSICAL LINE NUMBER 182A | VLAN ID 182B | | | |
| L6 | 1 | L5 | 1 | MAC10 | 1 | 10111 |
| L7 | 1 | L5 | 2 | MAC11 | 1 | 14578 |
| L8 | 1 | L5 | 1 | MAC12 | 0 | 19454 |
| | | | | MAC13 | 0 | 12195 |
| | | | | MAC14 | 0 | 14478 |
| | | | | MAC15 | 1 | 14532 |
| | | | | MAC16 | 1 | 16596 |
| | | | | MAC17 | 0 | 16578 |
| | | | | MAC18 | 1 | 15324 |
| ... | ... | ... | ... | ... | ... | ... |

EN60 → L6 row
EN70 → L7 row
EN80 → L8 row

FIG. 20

ROUTING TABLE 21

| NETWORK DESTINATION/ NETMASK ~211 | OUTPUT LINE INFORMATION ~212 | | NEXT HOP ~213 | |
|---|---|---|---|---|
| | PHYSICAL LINE NUMBER | VLAN ID | | |
| 10.10.1.0/24 | L1 | 2 | DIRECT | ~200-1 |
| 10.10.2.0/24 | L1 | 3 | DIRECT | ~200-2 |
| 10.10.3.0/24 | L1 | 1 | DIRECT | ~200-3 |
| | L5 | 1 | | |
| 10.10.4.0/24 | L5 | 2 | DIRECT | ~200-4 |
| ⋮ | ⋮ | ⋮ | ⋮ | |
| DEFAULT | L6 | — | 10.10.6.254 | ~200-n |
| | 212A | 212B | | |

FIG. 23

VLAN BUNDLING TABLE 58

| SUBSCRIBER SIDE LINE INFORMATION | | ISP SIDE LINE INFORMATION | | MAC ADDRESS | AGING BIT | TIME STAMP | |
|---|---|---|---|---|---|---|---|
| PHYSICAL LINE NUMBER | VLAN ID | PHYSICAL LINE NUMBER | VLAN ID | | | | |
| L1 | 1 | L100 | 1 | MAC1 | 1 | 10101 | — EN1-1 |
| L1 | 2 | L100 | 2 | MAC2 | 0 | 12395 | — EN1-2 |
| ... | ... | ... | ... | ... | ... | ... | |
| L1 | 32 | L100 | 1 | MAC32 | 1 | 15686 | — EN-32 |
| L2 | 1 | L100 | 1 | MAC33 | 0 | 13454 | — EN2-1 |
| L2 | 2 | L100 | 2 | MAC34 | 1 | 16542 | — EN2-2 |
| ... | ... | ... | ... | ... | ... | ... | |

FRAME FORWARDING APPARATUS FOR CONVERTING VLAN IDENTIFIERS

CLAIM OF PRIORITY

The present application claims priority from Japanese application serial No. 2006-017090, filed on Jan. 26, 2006, the content of which is hereby incorporated by reference into this application.

BACKGROUND OF THE INVENTION (1) Field of the Invention

The present invention relates to a frame forwarding apparatus and, more particularly, to a frame forwarding apparatus that connects a plurality of subscriber terminals to an Internet Service Provider (ISP) network, utilizing Virtual LANs (VLANs).

(2) Description of Related Art

When building an ISP network for connecting a plurality of subscriber terminals to the Internet, ISPs tend to adopt a Layer 2 frame forwarding apparatus, which is referred to as a Layer 2 Switch (L2SW) in this specification, instead of an expensive Internet Protocol (IP) packet forwarding apparatus because the L2SW is less expensive. Since a network using the L2SWs works LAN-based, there is a possibility intrinsic to the LAN that transmission data, addressed to a particular user, are intercepted by any other user terminal belonging to the same LAN. For this reason, in ISP networks using L2SWs, Tag VLANs (Virtual Local Area Networks) in Ethernet are used to assign an individual VLAN to each subscriber or each particular user group in order to assure secrecy of data communication across the LAN.

As regards switching apparatus for relaying VLAN frames, a switching apparatus enabling routing of both a received frame including a VLAN tag and a received frame not including a VLAN tag by utilizing the correspondence of each IP subnet address with a VLAN identifier is described in, for example, Japanese Unexamined Patent Publication No. 2003-244185.

In the ISP network, there exists an IP packet forwarding apparatus (ISP router) to connect to the Internet. "VLAN Aggregation for IP address Allocation" of RFC 3069 Network Working Group discloses effective IP address space utilization for IP subnets to be allocated to each subscriber terminal, by adopting a scheme such that a plurality of subscribers' VLANs (sub-VLANs) belong to one super-VLAN and a router allocates a common gateway address to these subscribers' VLANs.

SUMMARY OF THE INVENTION

In an ISP network using Tag VLANs, an IP packet transmitted from a subscriber terminal is forwarded in a frame format which includes a VLAN tag (VLAN ID) and each VLAN is terminated by an IP packet forwarding apparatus (hereinafter referred to as an ISP router) managed by an ISP. Here, VLAN termination means that the ISP router extracts an IP packet from a received frame to transmit it to the Internet when a VLAN tag frame (Ethernet frame) transmitted from a subscriber terminal was received, and that the ISP router converts a received packet into a VLAN tag frame having an appropriate VLAN ID corresponding to the destination IP address when the IP packet was received from the Internet and forwards the VLAN tag frame to a destination subscriber terminal, by referring to a routing table that previously stores the correspondence of each VLAN identifier (VLAN ID) with the IP address range of a sub-network allocated to the VLAN.

In the network architecture where subscribers' VLANs are terminated by the ISP router, there arises a problem of an increasing number of the VLANs to be terminated by the ISP router and an increasing number of entries in the routing table for defining the correspondence of VLAN ID with IP address. This architecture induces another problem such that some of the address space for the subnets to be allocated to subscribers' VLANs is wasted when the ISP router allocates a subnet IP address and a gateway address for each subscriber VLAN.

An object of the present invention is to provide a frame forwarding apparatus capable of suppressing an increase in the number of entries of the routing table provided in the ISP router and enabling effective utilization of the address space for subnets.

In order to achieve the above object, a frame forwarding apparatus according to the present invention is equipped with a plurality of line interfaces to connected to an IP packet forwarding apparatus through one of the line interfaces and to subscriber terminals through other line interfaces and comprised of a VLAN bundling table comprising a plurality of entries each defining the correspondence of subscriber side line information with IP packet forwarding apparatus side line information and subscriber terminal's MAC address, and a frame forwarding processing unit for controlling forwarding of frames each including a VLAN identifier, between each of subscriber terminals and the IP packet forwarding apparatus.

Each entry of the VLAN bundling table includes a physical line number and a subscriber VLAN identifier defined on a physical line having the physical line number as the subscriber side line information and a physical line number or a physical line connected to the IP packet forwarding apparatus and a group VLAN identifier defined on the physical line as the IP packet forwarding apparatus side line information, and at least one group of the entries in the VLAN bundling table include the same group VLAN identifier to each other as the IP packet forwarding apparatus side line information.

According to the invention, the frame forwarding processing unit operates, by referring to the VLAN bundling table, so as to convert a subscriber VLAN identifier given in a frame received from one of the subscriber terminals into a group VLAN identifier and forward the frame to the IP packet forwarding apparatus and to convert a group VLAN identifier given in a frame received from the IP packet forwarding apparatus and addressed to one of the subscriber terminals into a subscriber VLAN identifier and forward the frame to a specific physical line for the destination subscriber terminal.

More specifically, in the frame forwarding apparatus of the present invention, the frame forwarding processing unit searches the VLAN bundling table when forwarding the frame received from one of the subscriber terminals, for an entry including the subscriber VLAN identifier given in the received frame as the subscriber side line information and converts the subscriber VLAN identifier of the received frame into the group VLAN identifier specified in the searched out entry, and the frame forwarding processing unit searches the VLAN bundling table, when forwarding the frame received from the IP packet forwarding apparatus, for an entry having a MAC address value matched with the destination MAC address of the received frame and converts the group VLAN identifier of the received frame into the subscriber VLAN identifier specified in the searched out entry.

In this case, the frame received from a subscriber terminal is output to one of the line interfaces corresponding to a physical line number specified by the IP packet forwarding apparatus side line information in the entry searched out from the VLAN bundling table, and the frame received from the IP packet forwarding apparatus is output to one of the line interfaces corresponding to a physical line number specified by the subscriber side line information in the entry searched out from the VLAN bundling table.

In one embodiment of the invention, all of the one group of entries having the same group VLAN identifier include the same physical line number and the same subscriber VLAN identifier to each other as the subscriber side line information.

In another embodiment of the invention, all of the one group of entries having the same group VLAN identifier include the same physical line number and different subscriber VLAN identifiers to each other as the subscriber side line information.

In a further embodiment of the invention, the entries of the VLAN bundling table form a plurality of groups, each comprising a plurality of entries including the same physical line number to each other as the subscriber side line information, and the plurality of entries belonging to the same group include the same group VLAN identifier to each other as the IP packet forwarding apparatus side line information.

In a still further embodiment of the invention, at least one of the plurality of groups comprises a plurality of entries including the same physical line number and different subscriber VLAN identifiers to each other as the subscriber side line information and another group comprises a plurality of entries including the same physical line number and the same subscriber VLAN identifier to each other as the subscriber side line information.

The frame forwarding apparatus of the present invention can be operated as an Optical Line Terminal (OLT) in a Passive Optical Network (PON) system by applying, as the line interfaces connected to the subscriber terminals, line interfaces each provided with a function of terminating a PON frame and connected to a plurality of subscriber terminals via an optical fiber and branch fibers coupled to the optical fiber with an optical coupler.

According to the frame forwarding apparatus of the present invention, VLAN communication between the IP packet forwarding apparatus (ISP router) and each subscriber terminal is performed in such a manner that a plurality of subscriber VLANs are unified into one group VLAN. It is possible, therefore, to reduce the number of entries of a routing table in the IP packet forwarding apparatus and make effective use of addresses for IP subnets.

BRIEF DESCRIPTION OF DRAWINGS

FIG. 3 shows exemplary contents of a line information table provided in the L2SW 10.

FIG. 4 shows exemplary contents of a VLAN bundling table provided in the L2SW 10 in the first embodiment.

FIG. 10 shows exemplary contents of a VLAN bundling table provided in the L2SW 10 in the second embodiment.

FIG. 11 shows an example of a routing table 21 provided in an ISP router 20.

FIG. 12 shows an example of an ARP table 22 provided in the ISP router 20.

FIG. 14 shows exemplary contents of a VLAN bundling table provided in the L2SW 10 in the third embodiment.

FIG. 16 shows exemplary contents of a VLAN bundling table provided in the L2Sw 10 in the fourth embodiment.

FIG. 18 shows exemplary contents of a VLAN bundling table provided in one L2SW 10A in the fifth embodiment.

FIG. 19 shows exemplary contents of a VLAN bundling table provided in another L2SW 10B in the fifth embodiment.

FIG. 20 shows exemplary contents of a routing table 21 provided in the ISP router 20 in the fifth embodiment.

FIG. 23 shows exemplary contents of a VLAN bundling table 58 provided in the OLT 50.

DETAILED DESCRIPTION OF PREFERRED EMBODIMENTS

Embodiments of the present invention will now be described with reference to the drawings.

Figure 1:
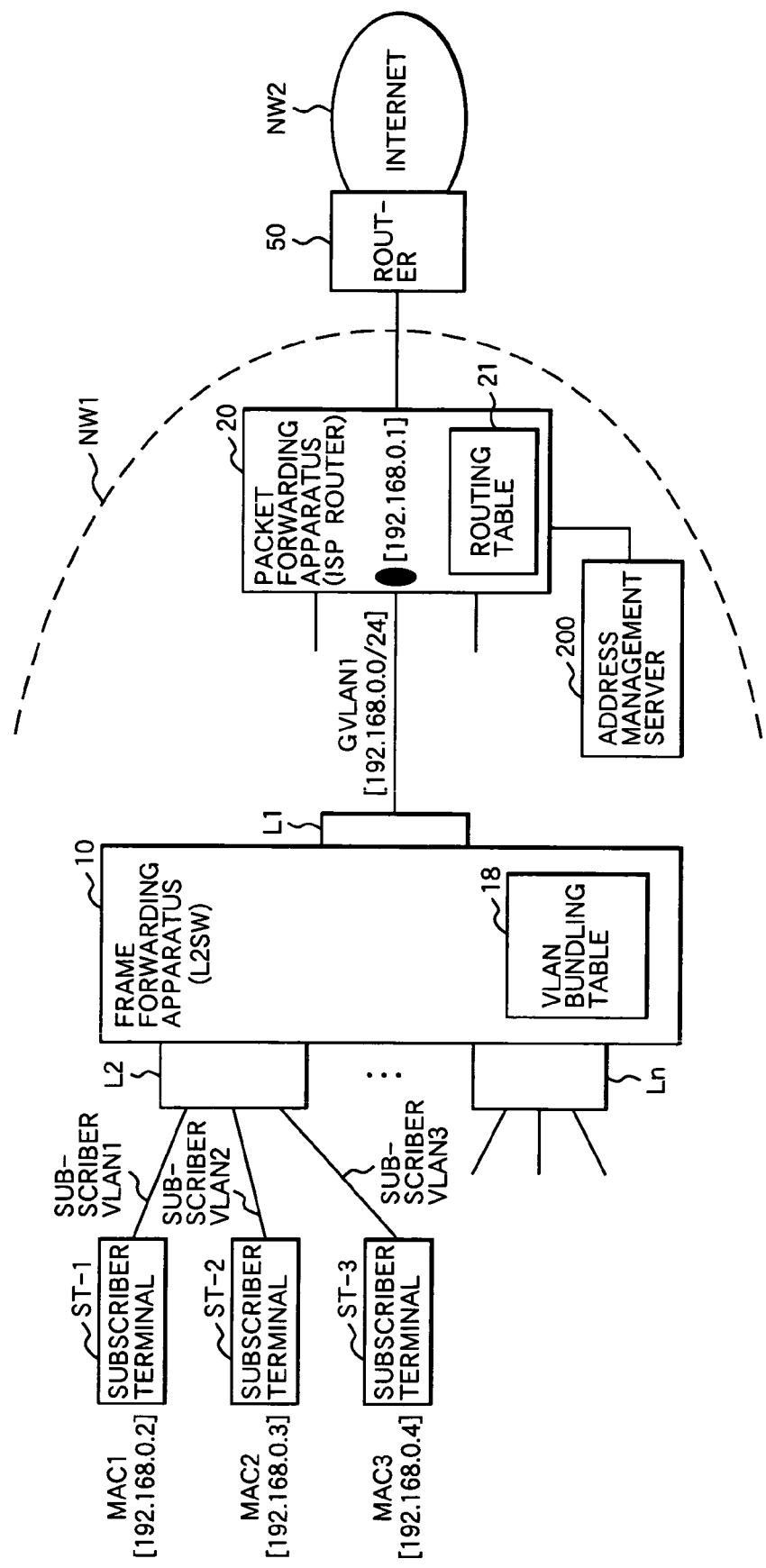
FIG. 1 schematizes a first embodiment of an ISP network to which a frame forwarding apparatus (L2SW) 10 of the present invention is applied.

FIG. 1 schematizes a first embodiment of an ISP (Internet Service Provider) network to which a frame forwarding apparatus (L2SW) of the present invention is applied.

The ISP network NW1 shown here comprises a frame forwarding apparatus 10 connected to a plurality of subscriber terminals STs (ST-1, ST-2, . . . ) and an IP packet forwarding apparatus (hereinafter referred to as an ISP router) 20 for connecting the frame forwarding apparatus 10 to the Internet NW2. The ISP router 20 is connected to the Internet NW2 via another router 50. The ISP router 20 has a routing table 21 and is connected to an address management server for allocating an IP address to each subscriber terminal ST. Alternatively, the function of allocating an IP address to each subscriber terminal ST may be incorporated into the ISP router 20.

The frame forwarding apparatus 10 is a communications device that controls forwarding of received frames (packets) in accordance with address information of Layer 2 defined in the OSI reference model. The frame forwarding apparatus 10 will be referred to as an L2SW in the following description. In FIG. 1, MAC1, MAC2 and MAC3 attached to each subscriber terminal denote the MAC addresses of the subscriber terminals ST-1, ST-2 and ST-3, respectively. Numeric values in brackets [ ] denote the IP address values assigned to each subscriber terminal.

In the first embodiment, the L2SW 10 is connected to the ISP router through a line L1 and connected to the subscriber terminals STs through lines L2 to Ln. The L2SW 10 creates individual virtual LANs for each subscriber terminal on a same physical line by using a VLAN (Virtual LAN) tag included in an Ethernet header in order to assure independency or security of the communications for the subscriber terminals ST-1 to ST-3 connected to the same physical line, for example, the line identified by L2.

According to the Tag VLAN scheme, a maximum of 4096 logical LANs can be created on the same physical line and an independent broadcast domain can be provided for each VLAN. In the following description, an individual VLAN defined between the L2SW 10 and a subscriber terminal ST will be termed a "subscriber VLAN" and the identifier of the subscriber VLAN will be termed a subscriber VLAN ID. Similarly, a VLAN defined between the L2SW 10 and the ISP router 20 will be termed a "group VLAN" and its identifier will be termed a group VLAN ID or abbreviated to a GVLAN ID.

In the first embodiment, the L2SW 10 communicates Ethernet frames, each including a VLAN tag (a subscriber VLAN ID or group VLAN ID), with each subscriber terminal ST and the ISP router 20. Upon receiving an Ethernet frame from a subscriber terminal ST (ST-1 to ST-3), the L2SW 10 converts the subscriber VLAN ID included in the received frame into a group VLAN ID, according to definitions in a VLAN bundling table 18, which will be described later, and transmits the frame to the ISP (router) side connection line L1. Inversely, upon receiving an Ethernet frame from the ISP side connection line L1, the L2SW 10 converts the group VLAN ID included in the received frame into a subscriber VLAN ID, according to the definitions in the VLAN bundling table 18, and transmits the frame to an appropriate subscriber side connection line L2.

By the above conversion from a subscriber VLAN ID to a group VLAN ID or its inverse conversion by the L2SW 10, only one VLAN, a group VLAN "GVLAN1" in FIG. 1, appears to exist on the connection line L1 for the L2SW 10 with viewed from the ISP router 20, though a plurality of individual VLANs actually exist beyond the L2SW.

In the first embodiment, the ISP router 20 assigns an IP address "192.168.0.0/24" to the GVLAN1 on the connection line L1 and treats the L2SW 10 and the subscriber terminals STs connected to the line L2 as one sub-network. In an IP network, a sub-network means a network unit to be a transmission range (domain) of broadcast packets. The above IP address "192.168.0.0/24" indicates that the sub-network has an IP address range from "192.168.0.0" to "192.168.0.255". Therefore, the ISP router 20 treats the IP addresses "192.168.0.2" to "192.168.0.4" of the subscriber terminals ST-1 to ST-3 as those belonging to the same sub-network. Upon receiving a packet having a destination address that is any one within "192.168.0.0" to "192.168.0.4" from the Internet NW2, the ISP router 20 converts the IP packet into an Ethernet frame having the group VLAN ID of "GVLAN1" and forwards the Ethernet frame to the connection line L1.

As a general rule, a router can allocate only one sub-network to each LAN. In the case where the L2SW 10 extends the subscribers' VLANs (subscriber VLAN1 to subscriber VLAN3 in FIG. 1) along the connection line L1 straightforwardly, the ISP router 20 would have to allocate a sub-network (IP address range), a gateway IP address, and a VLAN ID individually to each of these subscribers' VLANs.

According to the present embodiment, since the L2SW 10 unifies a plurality of subscribers' VLANs (subscriber VLAN1 to subscriber VLAN3 in FIG. 1) into one group VLAN (GVLAN1 in FIG. 1), the ISP router 20 can complete its allocation task by solely allocating a sub-network, a gateway IP address ("192.168.0.1" in FIG. 1), and a VLAN ID to the above group VLAN. Upon receiving an IP packet from the Internet side, the ISP router 20 searches the routing table for a VLAN ID corresponding to the destination IP address of the received packet, converts the received packet into an Ethernet frame including the above VLAN ID as the VLAN tag, and forwards the Ethernet frame to the line L1. In this case, according to the present embodiment, it is able to reduce the number of entries in the routing table 21 remarkably because the number of VLAN IDs to be defined on the line L1 can be reduced.

Figure 2:
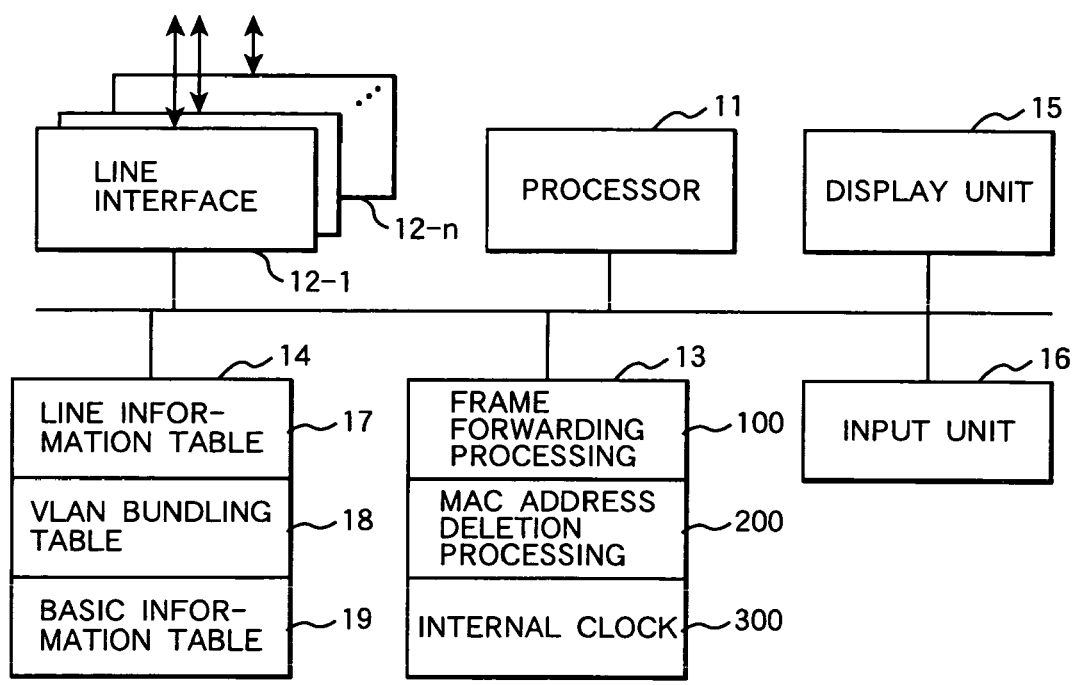
FIG. 2 is a block diagram showing a configuration of the frame forwarding apparatus (L2SW) 10.

FIG. 2 is a block diagram showing an example of a configuration of the frame forwarding apparatus (L2SW) 10.

The L2SW 10 comprises a processor 11, a plurality of line interfaces 12 (12-1 to 12-n), a program memory 13, a data memory 14, a display unit 15, and an input unit 16. In the program memory 13, a frame forwarding processing routine 100, a MAC address deletion processing routine 200, and an internal clock routine 300 are installed as programs relevant to the present invention, which are executed by the processor 11. The data memory 13 stores a line information table 14 indicative of the connection destinations of the line interfaces 12 (12-1 to 12-n), a VLAN bundling table 18 to be referred to for VLAN ID conversion, and a basic information table storing information such as the time to live for each entry in the VLAN bundling table and the cycle time with which the MAC address deletion processing routine 200 is periodically activated.

FIG. 3 shows exemplary contents of the line information table 17.

The line information table 17 comprises a plurality of entries corresponding to the line interfaces 12-1 to 12-n. Each entry includes a physical line number 171, a subscriber side connection flag 172, and an ISP side (router side) connection flag 173. The physical line number l71, indicates the line number of a physical line connected to the line interface and is used as the identifier of the line interface.

If the physical line is a subscriber terminal connection line (L2 to Ln in FIG. 1), the subscriber side connection flag 172 is set to "1" and the ISP side connection flag 173 is set to "0". If the physical line is an ISP router connection line (L1 in FIG. 1), the subscriber side connection flag 172 is set to "0" and the ISP side connection flag 173 is set to "1". The set values of the flags 172 and 173 are exclusive to each other. Hence, instead of these two flags, one flag may be used such that, for example, a flag value "1" indicates the subscriber terminal connection line and a flag value "0" indicates the ISP connection line.

In a process of forwarding a frame received by a line interface 12$j$ (j=1 to n), the processor 11 searches the line information table 17 for an entry corresponding to the line interface identifier (physical line number) and determines whether the received frame is the one arrived from the subscriber terminal side and to be forwarded to the ISP router 20 or the one arrived from the ISP router side and to be forwarded to a subscriber terminal connection line, according to the flags 172 and 173.

FIG. 4 shows exemplary contents of the VLAN bundling table 18 provided in the L2SW 10 in FIG. 1.

The VLAN bundling table 18 in this embodiment comprises a plurality of entries (EN-1, EN-2, ... ) corresponding to the subscriber VLAN IDs. Each entry EN comprises a plurality of fields for indicating subscriber side line information 181, ISP side line information 182, MAC address 183, aging bit 184, and time stamp 185. The subscriber side line information 181 includes a physical line number 181A of a physical line to which a subscriber terminal ST is connected and a VLAN ID (subscriber VLAN ID) 181B indicating a VLAN defined on that physical line. The ISP side line information 182 includes a physical line number 182A of a physical line connected to the ISP router and a VLAN ID (group VLAN ID) 182B indicating a VLAN defined on that physical line.

The MAC address 183 indicates the MAC address of a subscriber terminal ST. The aging bit 184 and time stamp 185 are used by the MAC address deletion processing routine 202, which will be described later, in order to delete the MAC address 183 from the table entry of the subscriber VLAN for which frame transmission ceases for a predetermined time or longer.

As apparent from the entries EN-1, EN-2 and EN-3, the VLAN bundling table 18 exemplified here shows that subscriber terminals ST-1, ST-2 and ST-3 having their MAC addresses MAC1, MAC2 and MAC3, respectively, are connected to the line L2 specified by the physical line number 181A through individual subscriber VLANs having ID values of "1", "2" and "3", respectively, specified by the VLAN ID 181B, and that these subscriber VLANs are unified into a group VLAN having an ID value "1" specified by the VLAN ID 182B, being on the line L1 specified by the physical line number 182A.

For example, when a frame transmitted from a subscriber terminal ST-2 was received through a line interface 12-2 connected to the line L2, the processor 11 searches the VLAN bundling table 18 for the entry EN-2, using the line number L2 and the VLAN tag (subscriber VLAN ID "2") extracted from the Ethernet header of the received frame as a search key. The processor 11 then converts the value of the VLAN tag (VLAN ID) of the received frame from the subscriber VLAN ID "2" to the group VLAN ID "1" in accordance with the ISP side line information 182. The frame with the converted tag is forwarded to the ISP router 20 through the line interface 12-1 for the physical line number L1 in accordance with the ISP side line information 182.

Reversely, when a frame including "MAC2" as the destination MAC address was received through the line interface 12-1 connected to the physical line L1, the processor 11 searches the VLAN bundling table 18 for the entry EN-2, using the destination MAC address extracted from the received frame a search key. The processor 11 converts the VLAN tag of the received frame from the group VLAN ID "1" to the subscriber VLAN ID "2" in accordance with the subscriber side line information 181 in the entry EN-2 and transmits the frame to the subscriber terminal ST-2 through the line interface 12-1 for the physical line L2.

Figure 5:
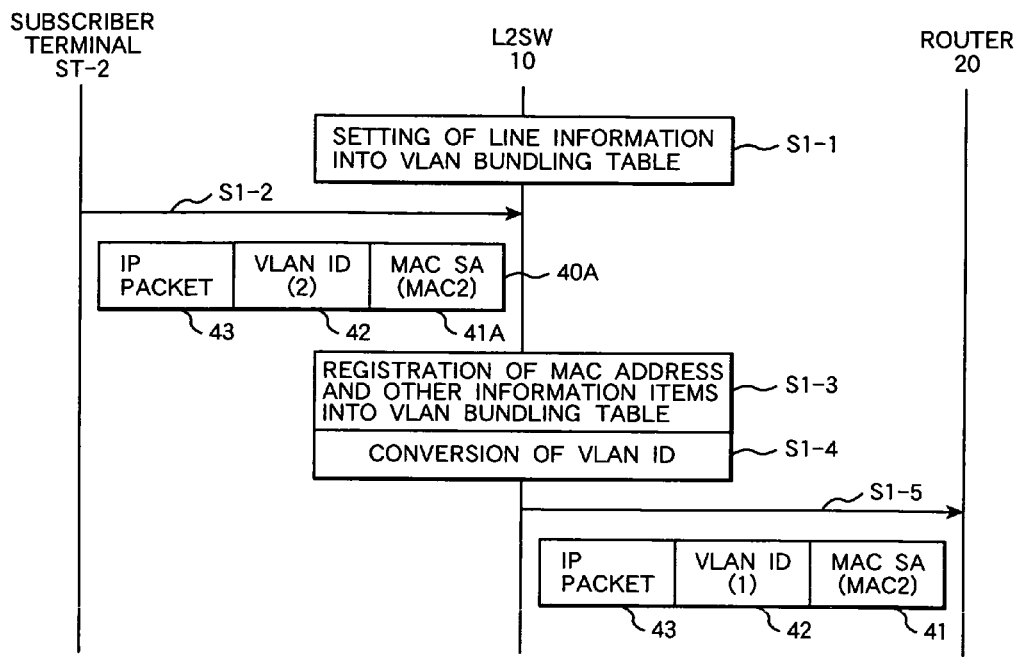
FIG. 5 is a sequence diagram to illustrate the operation of the L2SW 10 to be performed when a frame was received from a subscriber terminal in the state where its MAC address has not been registered yet.

FIG. 5 is a sequence diagram to illustrate the operation of the L2SW 10 to be performed when a frame was received from a subscriber terminal, in the state where the MAC address 183 has not been registered yet in the VLAN bundling table 18.

When the L2SW 10 has connected to the ISP router 20, an ISP manager registers initial data into the line information table 17 and the VLAN bundling table 18 of the L2SW 10. In the VLAN bundling table 18 (S1-1), table entries each corresponding to the VLAN ID for each of the subscribers accommodated by the L2SW 10 are registered. At this time, each entry has valid data only in the fields of subscriber side line information 181 and ISP side line information 182, but fields of the MAC address 183, aging bit 184, and time stamp 185 are empty, i.e., no data has been set in these fields.

In the state where the value of MAC address 183 has not been registered yet in the VLAN bundling table 18, it is assumed that, for example, a subscriber terminal ST-2 transmits a frame 40A including "MAC2" as the source MAC address 41A and subscriber VLAN ID "2" as the VLAN tag 42 in the Ethernet header and an IP packet 43 in the payload (S1-2). In this case, the L2SW 10 extracts the VLAN tag (subscriber VLAN ID "2") from the received frame and searches the VLAN bundling table 18 for the entry EN-2 corresponding to the subscriber VLAN ID "2". In this case, since a MAC address has not been registered yet in the searched out entry EN-2, the L2SW 10 registers the value of the source MAC address "MAC2" extracted from the received frame into the entry EN-2, sets the aging bit 184 to "1", and registers the present time in the time stamp 185 field (S1-3).

After that, the L2SW converts the VLAN tag 42 of the received frame into the group VLAN ID "1" (S1-4) in accordance with the ISP side line information 182 of the entry EN-2 and forwards the received frame to the ISP router 20 through the line interface 12-1 corresponding to the line L1 (S1-5). If a frame like the above was received from the subscriber ST-2 for which the MAC address has been registered already, the L2SW 10 skips the MAC address registration in step S2-3 and performs the same operation as above.

Figure 6:
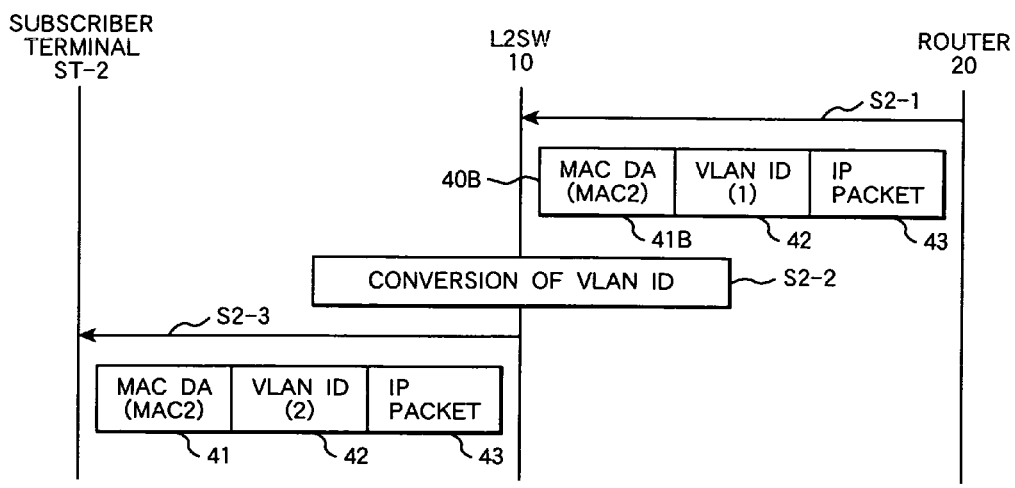
FIG. 6 is a sequence diagram to illustrate the operation of the L2SW 10 to be performed when a frame addressed to a subscriber was received from a router in the state where the MAC address has been registered already.

FIG. 6 shows a sequence diagram to illustrate the operation of the L2SW 10 to be performed when a frame 40B including the MAC address "MAC2" of the subscriber terminal ST-2 as the destination MAC address was received from the ISP router 20, in the state where the MAC address has been registered in the VLAN bundling table 18.

Upon receiving the frame from the ISP router 20 (S2-1), the L2SW 10 extracts the destination MAC address "MAC2" from the received frame and searches the VLAN bundling table 18 for the entry EN-2 having the value of the MAC address 183 that matches with "MAC2". The L2SW 10 converts the VLAN tag 42 of the received frame into the subscriber VLAN ID "2" (S2-2) in accordance with the subscriber side line information 181 specified in the entry EN-2. Then, the L2SW 10 forwards the received frame to the subscriber terminal ST-2 through the line interface 12-2 corresponding to the physical line number L2 (S2-3).

Figure 7:
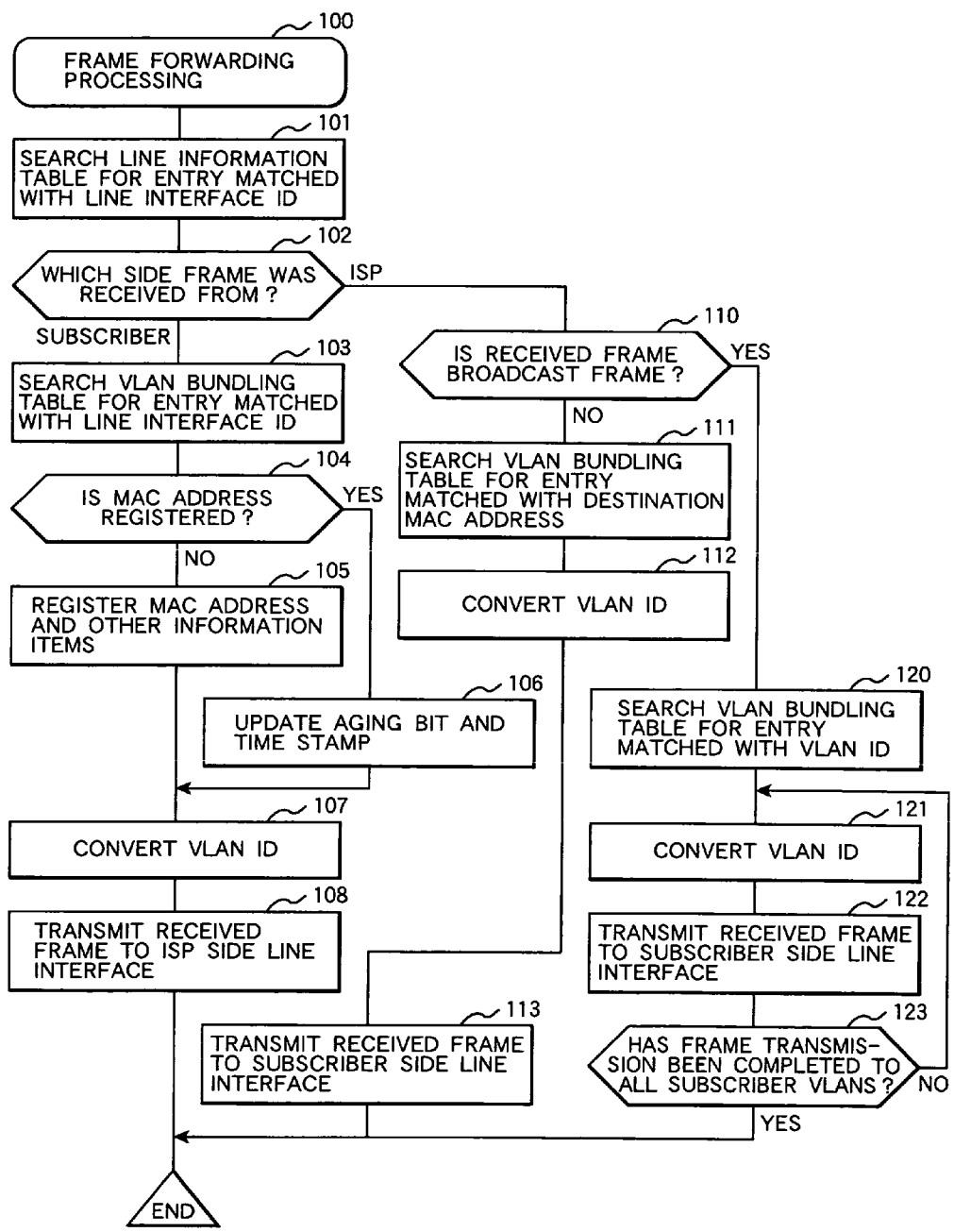
FIG. 7 is a flowchart of a frame forwarding processing routine 100 to be executed by the processor of the L2SW 10.

FIG. 7 shows a flowchart of the frame forwarding processing routine 100 to be executed by the processor 11 of the L2SW 10. The processor 11 accesses the line interfaces 12-1 to 12-n sequentially, processes a frame received by an line interface 12-i in accordance with the frame forwarding processing routine 100, and forwards the frame to an appropriate line interface 12-j.

The processor 11 searches the line information table 17 for an entry matched with the identifier of the line interface having received the frame (101) and determines whether the frame reception line is a subscriber side line or an ISP side line (102). If the frame reception line is a subscriber side line, the processor 11 searches the VLAN bundling table 18 for an entry corresponding to the physical line number and VLAN tag (subscriber VLAN ID) of the received frame (103) and determines whether a MAC address 183 value has already been registered in that entry (104). If no MAC address has been registered in the entry, the processor 11 registers the source MAC address of the received frame into the entry, sets the aging bit to "1" and registers the present time in the time stamp 185 field (105), and converts the VLAN tag of the received frame into the group VLAN ID (107) in accordance with the ISP side line information of the entry. If the MAC address has already been registered in the entry, the processor 11 sets the aging bit to "1" and registers the present time in the time stamp 185 field of the entry (106), and executes the VLAN tag (VLAN ID) conversion of the received frame (107). After that, the processor 11 transmits the received frame to a line interface specified by the ISP side physical line number 182A of the entry (108) and terminates this routine.

If the frame reception line is a ISP side line, the processor 11 determines whether the destination MAC address of the received frame is a broadcast address (110). If the destination MAC address is not a broadcast address, the processor 11 searches the VLAN bundling table 18 for an entry corresponding to the destination MAC address (111). The processor 11 converts the VLAN tag of the received frame into the subscriber VLAN ID (112) in accordance with the subscriber side VLAN ID 181A specified in the searched out entry, transmits the received frame to a line interface specified by the subscriber side physical line number 181B of the entry (113) and terminates this routine.

If the received frame includes, for example, an ARP (Address Resolution Protocol) packet for inquiring a MAC address by specifying an IP address when the MAC address of a communication peer terminal is unknown, a broadcast address is applied to the destination MAC address. Upon receiving a frame having such a broadcast MAC address from the ISP router 20, the L2SW 10 searches the VLAN bundling table 18 for an entry based on the VLAN tag (group VLAN ID) of the received frame and converts the received frame into a plurality of individual frames each having a unique subscriber VLAN ID.

At step 110, if the destination MAC address of the received frame is a broadcast address, the processor 11 extracts the VLAN tag (group VLAN ID) from the received frame and searches the VLAN bundling table 18 for entries each having the ISP side VLAN ID 182B value matched with the extracted group VLAN ID (120). As apparent from FIG. 4, the VLAN bundling table 18 includes a plurality of table entries each having the ISP side VLAN ID 182B value matched with the group VLAN ID of the received frame.

In accordance with the subscriber side line VLAN ID 181A specified in each of entries searched out from the VLAN bundling table 18, the processor 11 converts the VLAN tag of the received frame into the subscriber VLAN ID (121) and transmits the received frame to a line interface specified by the subscriber side physical line number 181B (122). After that, the processor 11 determines whether the processing to transmit the received frame has been completed for all table entries corresponding to the group VLAN ID (123). If there is an entry for which the processing is not performed, the processor 11 repeats the steps 121 to 122. Upon the completion of the processing to transmit the received frame with respect to all table entries associated with the group VLAN ID, the processor 11 terminates this routing.

Figure 8:
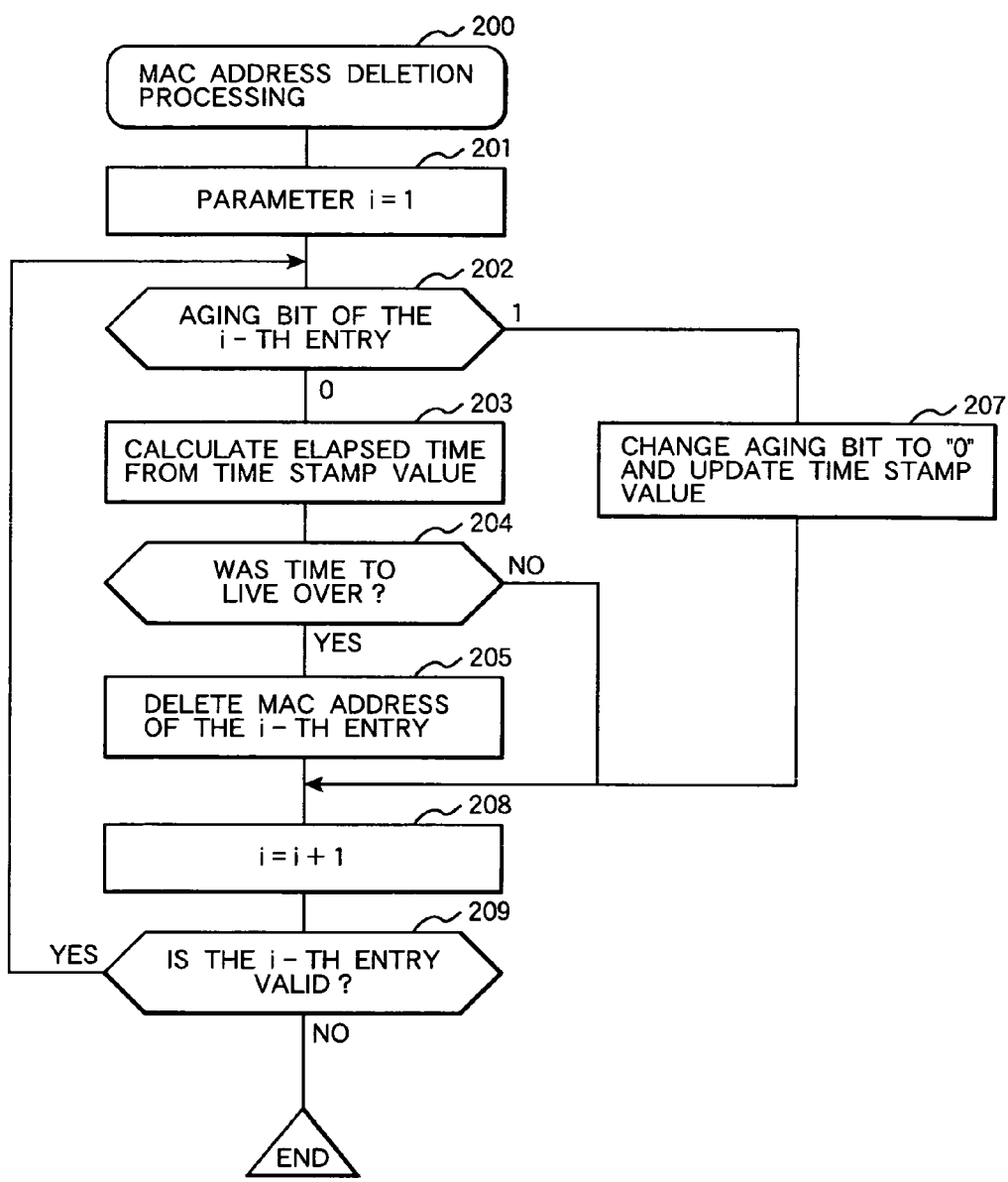
FIG. 8 is a flowchart of a MAC address deletion processing routine 200 to be executed by the processor of the L2SW 10.

FIG. 8 illustrates a flowchart of the MAC address deletion processing routine 200 to be periodically executed by the processor 11.

The MAC address deletion processing routine 200 is executed to delete from the VLAN bundling table 18 a MAC address that has become unnecessary because the communication using the MAC address has ceased. In the present embodiment, the processor 11 executes the MAC address deletion processing routine 200 at a cycle time ΔT shorter than time to live T given to each entry in the VLAN bundling table 18. Once having found an entry for which the time to live has expired, the processor 11 erases the MAC address automatically. The remaining time to live for each entry is calculated from the present time and the time stamp that is updated each time a frame was received from the subscriber terminal.

For example, when the MAC address deletion processing routine 200 is activated by a timer interruption of cycle time ΔT, the processor 11 sets the value of a parameter "i" for specifying a table entry in the VLAN bundling table 18 to "1" (201) and checks the aging bit 184 of the i-th entry (202). If the aging bit 184 is "1", that is, the i-th entry is the one for which a frame received from the subscriber terminal has recently been processed, the processor 11 changes the aging bit 184 to "0" (207), increments the value of the parameter i by one (208), and determines whether the i-th entry of the VLAN bundling table 18 is valid (209). If the i-th entry is valid, the processor 11 executes the step 202 again. Otherwise, the processor 11 terminates this routine, regarding all entries in the VLAN bundling table 18 as having been checked.

If the aging bit 184 of the i-th entry is "0", the processor 11 calculates elapsed time Tp from reception of the last frame based on the time value indicated by the time stamp 185 and the present time indicated by the internal clock 300 (203) and compares the elapsed time Tp with the time to live T specified beforehand in the basic information table 19 (204). If the elapsed time Tp is not over the time to live T, the processor 11 executes the step 208. If the elapsed time Tp is over the time to live T, the processor 11 executes the step 208 after deleting the values of MAC address 183, aging bit 184, and time stamp 185 from the i-th entry.

Figure 9:
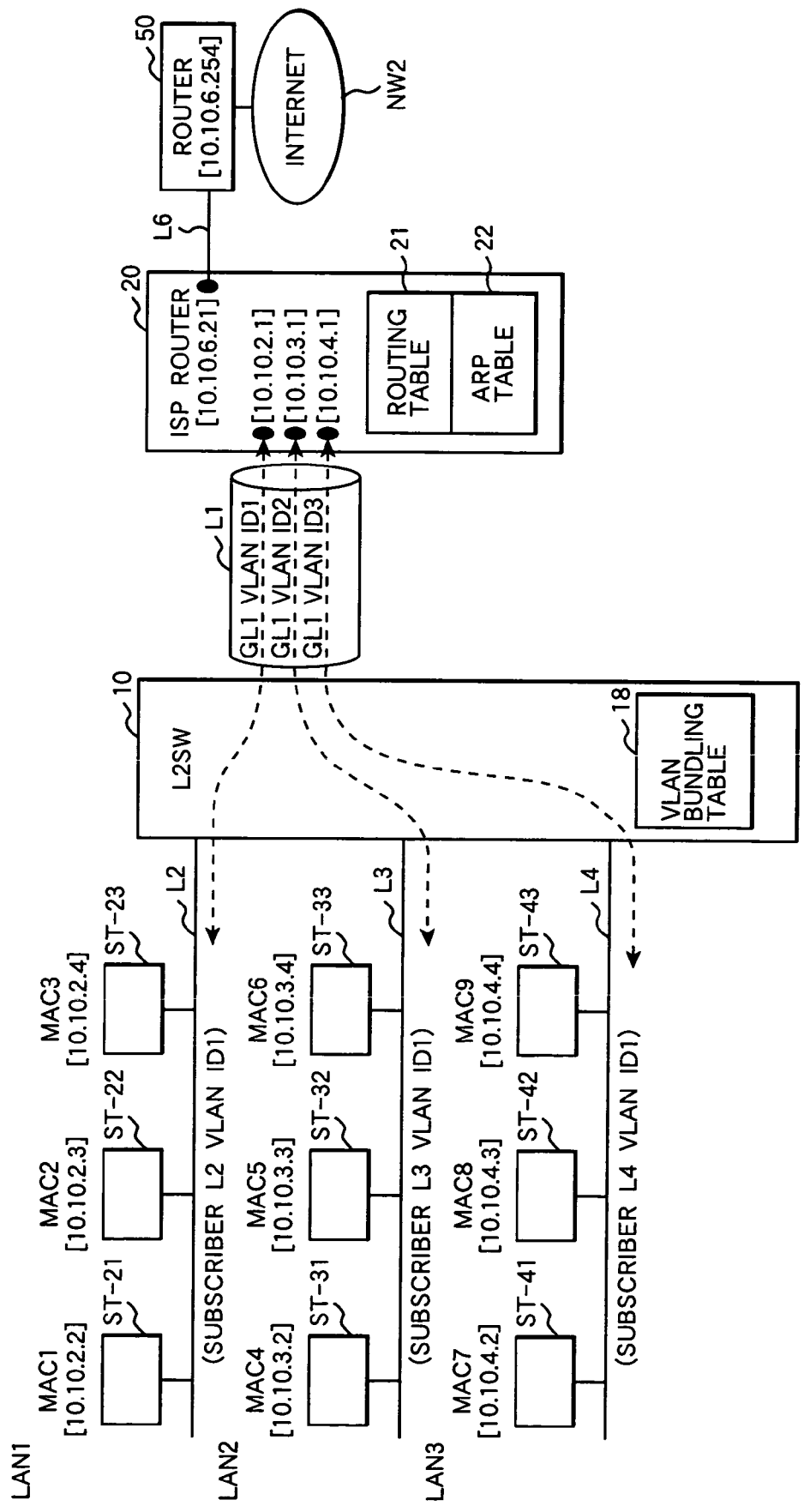
FIG. 9 schematizes a second embodiment of an ISP network to which the frame forwarding apparatus (L2SW) of the present invention is applied.

FIG. 9 schematizes a second embodiment of an ISP network to which the frame forwarding apparatus (L2SW) of the present invention is applied. In the second embodiment, a plurality of group VLANs are multiplexed on the connection line L1 between the L2SW 10 and the ISP router 20.

In the second embodiment, a plurality of LANs (LAN1, LAN2, LAN3), to each of which a plurality of subscriber terminals are connected, are connected to the subscriber lines L2, L3 and L4 of the L2SW 10, respectively. On the subscribe side line L2, a VLAN (subscriber L2 VLAN) to which subscriber terminals ST-21, ST-22 and ST-23 belong as members is created. On the subscriber side line L3, a VLAN (subscriber L3 VLAN) to which subscriber terminals ST-31, ST-32 and ST-33 belong as members is created. On the subscriber side line L4, a VLAN (subscriber L4VLAN) to which subscriber terminals ST-41, ST-42 and ST-43 belong as members is created. Each of subscriber terminals belonging to the same VLAN applies the same subscriber VLAN ID to its transmission frames.

In the present embodiment, the L2SW 10 converts the subscriber L2VLAN into a first group VLAN (GL1 VLAN) being on the line L1, converts the subscriber L3VLAN into a second group VLAN (GL2 VLAN) being on the line L1, and converts the subscriber L4VLAN into a third group VLAN (GL3 VLAN) being on the line L1.

As shown in FIG. 9, the ISP router 20 assigns a gateway IP address "10.10.2.1" to the first group VLAN (GL1 VLAN) and defines IP addresses "10.10.2.0/24" as the address range of sub-network of this group. Likewise, the ISP router 20 assigns a gateway IP address "10.10.3.1" to the second group VLAN (GL2 VLAN) and a gateway IP address "10.10.4.1" to the third group VLAN (GL3 VLAN), thereby to specify the IP address range of sub-network for each group.

FIG. 10 illustrates a VLAN bundling table 18 provided in the L2SW 10 in the second embodiment.

The VLAN bundling table 18 comprises a plurality of entry groups EN20, EN30 and EN40 each defining a group VLAN ID 182B different for each subscriber-side physical line number 181A. Each group includes a plurality of sub-entries EN-21 to EN23, EN-31 to EN33 and EN-41 to EN43, each of which indicates MAC address 183, aging bit 184, and time stamp 185 for each subscriber terminal.

The processor 11 of the L2SW 10 processes frames received from the lines L1 to L4, according to the frame forwarding processing routine 100 described with reference to FIG. 7.

For example, in the case of processing a frame received from a subscriber terminal ST-21 belonging to the LAN1, the processor 11 searches the VLAN bundling table 18 for an entry group EN20 having a value of subscriber VLAN ID 181B matched with the VLAN tag of the received frame. The processor 11 converts the VLAN tag of the received frame from a subscriber VLAN ID into a group VLAN ID in accordance with the group VLAN ID 182B.

Reversely, in the case of processing a frame having been received from the line L1 and including the MAC address "MAC1" of the subscriber terminal ST-21 as the destination MAC address, the processor 11 searches the VLAN bundling table 18 for a sub-entry EN-21 having a value of the MAC address 183 matched with the destination MAC address of the received frame. The processor 11 converts the VLAN tag of the received frame from a group VLAN ID to a subscriber VLAN ID in accordance with the subscriber VLAN ID 181B associated with this sub-entry. In this manner, mutual conversion between a subscriber VLAN and a group VLAN shown in FIG. 9 can be performed.

FIG. 11 shows an example of a routing table 21 provided in the ISP router-20 in the second embodiment.

The routing table 21 comprises a plurality of entries, each indicating the relationship between sub-network IP address range (network destination/netmask) 211, output line information 212, and next hop 213. The output line information 212 particularly represents a physical line number 212A and a VLAN ID 212B being connected to the ISP router 20 and the next hop 213 represents the address of a next router to which an IP packet should be forwarded.

"Direct" given in the next hop 213 field means that a received IP packet is directly forwarded to the destination user terminal without being routed via another router. In this case, the ISP router 20 retrieves the MAC address of the user terminal from the ARP table 22 which is shown in FIG. 12, using the destination IP address of the IP packet as a search key. Applying this MAC address to the destination address, the ISP router 20 transmits an Ethernet frame including the received IP packet to a line interface specified by the physical line number 212A.

The ARP table 22 indicates the correspondence of an IP address 221 assigned to each user terminal with a MAC address 222 of the user terminal, as exemplified in FIG. 12.

Figure 13:
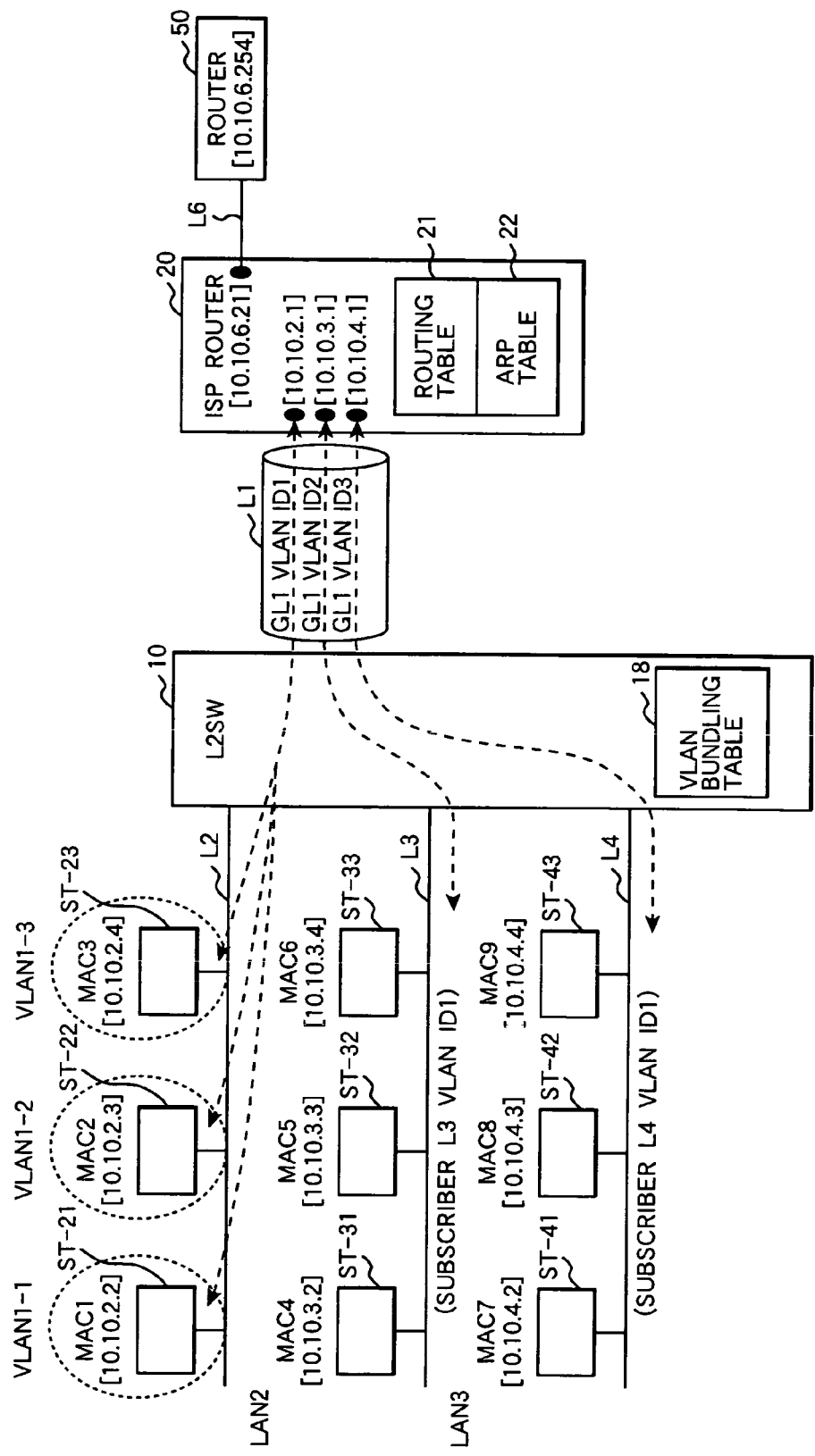
FIG. 13 schematizes a third embodiment of an ISP network to which the frame forwarding apparatus (L2SW) of the present invention is applied.

FIG. 13 schematizes a third embodiment of an ISP network to which the frame forwarding apparatus of the present invention is applied.

The third embodiment is characterized in that a plurality of group VLANs are multiplexed on the connection line L1 between the L2SW 10 and the ISP router 20 and that a plurality of subscriber VLANs are unified into one of the group VLANs such as GL1 VLAN exemplified here.

In comparison with the second embodiment shown in FIG. 9, a difference lies in that subscriber terminals ST-21, ST-22 and ST-23 form individual subscriber VLANs (VLAN1-1 to VLAN 1-3), respectively, on the subscriber side line L2, as similar to the case for the first embodiment shown in FIG. 1.

FIG. 14 illustrates a VLAN bundling table 18 provided in the L2SW 10 in the third embodiment.

An entry group EN20 with a value "1" as the group VLAN ID 182 has substantially the same contents as that of the VLAN bundling table for the first embodiment shown in FIG. 4. Other entry groups EN30 and EN40 have substantially the same contents as those of the corresponding groups in the VLAN bundling table for the second embodiment shown in FIG. 10.

In the L2SW 10 for the third embodiment as well, the processor 11 can execute VLAN tag conversion between a subscriber VLAN and a group VLAN in accordance with the frame forwarding processing routine 100 having been described in conjunction with FIG. 7.

Figure 15:
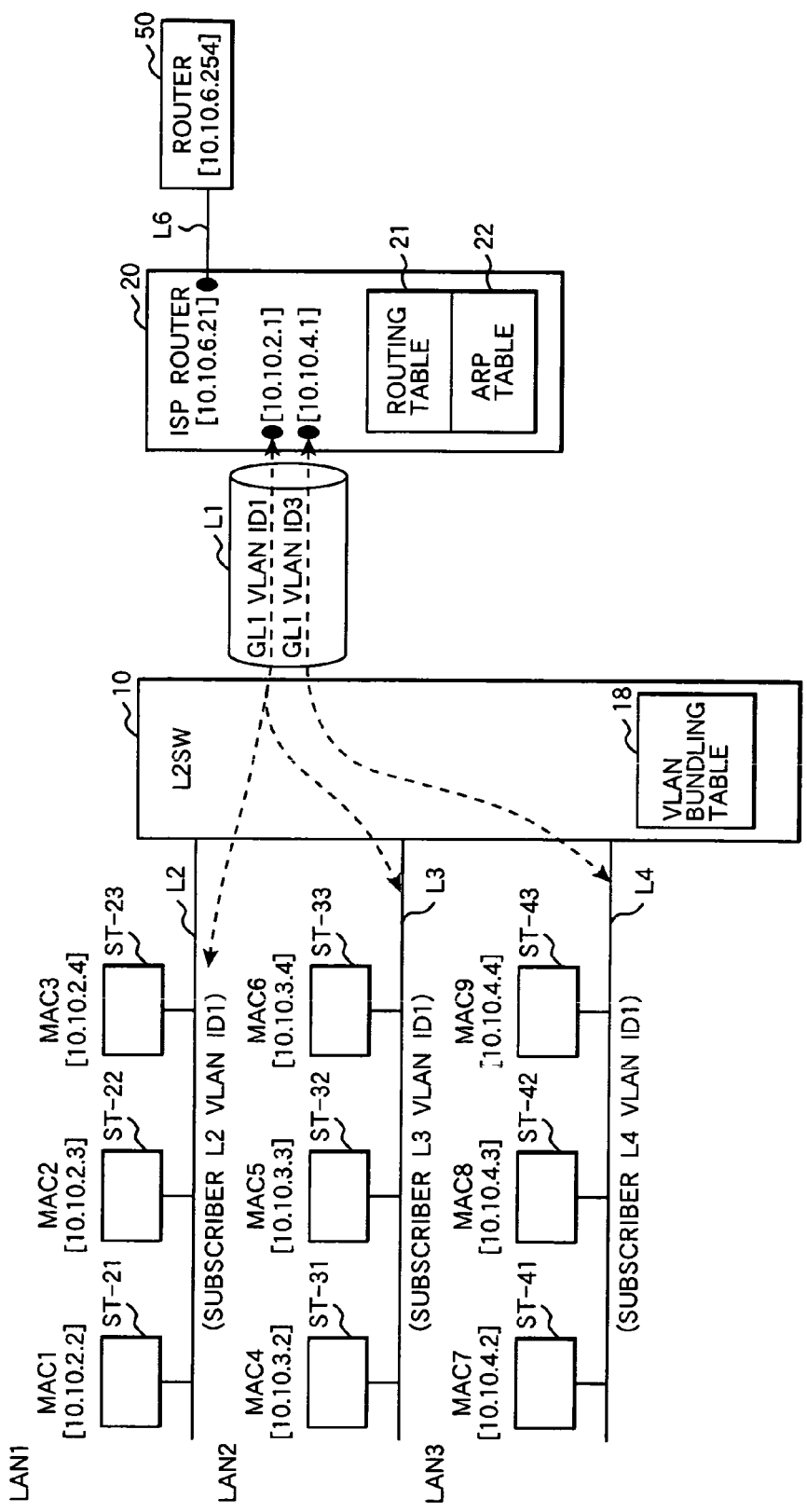
FIG. 15 schematizes a fourth embodiment of an ISP network to which the frame forwarding apparatus (L2SW) of the present invention is applied.

FIG. 15 schematizes a fourth embodiment of an ISP network to which the frame forwarding apparatus of the present invention is applied.

The fourth embodiment is characterized in that subscriber L2VLAN and subscriber L3VLAN, as described in FIG. 9, are unified into the same group VLAN (GL1 VLAN ID1) being on the line L1 and subscriber L4VLAN is unified into another group VLAN (GL1 VLAN ID3) being on the line L1.

FIG. 16 illustrates a VLAN bundling table 18 provided in the L2SW 10 in the fourth embodiment.

In comparison with the VLAN bundling table 18 shown in FIG. 10, a difference lies in that an entry group EN20 for the subscriber L2VLAN and an entry group EN30 for the subscriber L3VLAN have the same ISP side line information 182. In the L2SW 10 for the forth embodiment as well, the processor 11 can execute VLAN tag conversion between a subscriber VLAN and a group VLAN in accordance with the frame forwarding processing routine 100 having been described in conjunction with FIG. 7.

Figure 17:
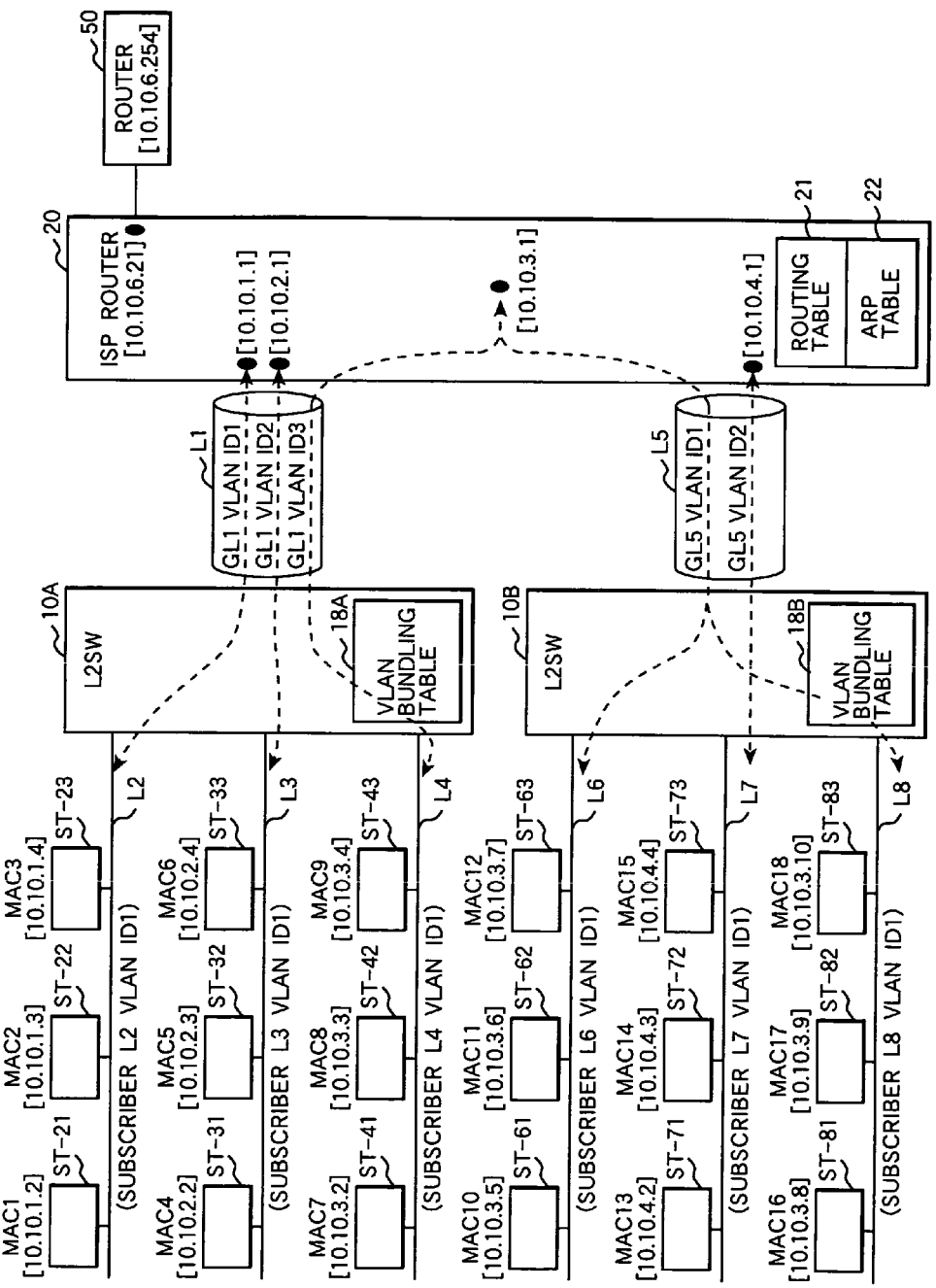
FIG. 17 schematizes a fifth embodiment of an ISP network to which the frame forwarding apparatus (L2SW) of the present invention is applied.

FIG. 17 schematizes a fifth embodiment of an ISP network to which the frame forwarding apparatus of the present invention is applied.

The fifth embodiment is characterized in that a first L2SW 10A is connected to the ISP router 20 via a line L1 and a second L2SW 10B is connected to the ISP router 20 via a line L5, and that the ISP router 20 treats a group LAN (GL1 VLAN ID3) defined on the line L1 and a group VLAN (GL5 VLAN ID1) defined on the line L5 as one sub-network. Here, the group VLAN (GL1 VLAN ID3) corresponds to a subscriber VLAN (L4VLAN) being on a line L4 and the group VLAN (GL5 VLAN ID1) unifies a subscriber VLAN (L6VLAN) being on a line 6 and a subscriber VLAN (L8VLAN) being on a line L8.

On the line L1, besides the group VLAN (GL1 VLAN ID3), a group VLAN (GL1 VLAN ID1) corresponding to a subscriber VLAN (L2VLAN) being on a line L2 and a group VLAN (GL1 VLAN ID2) corresponding to a subscriber VLAN (L3VLAN) being on a line L3 are defined. On the line L5, besides the group VLAN (GL5 VLAN ID1), a group VLAN (GL5 VLAN ID2) corresponding to a subscriber VLAN (L7VLAN) being on a line L7 is defined.

FIG. 18 illustrates a VLAN bundling table 18A provided in the L2SW 10A in the fifth embodiment.

The VLAN bundling table 18A has the same contents as those of the VLAN bundling table 18 for the second embodiment shown in FIG. 10.

FIG. 19 illustrates a VLAN bundling table 18B provided in the L2SW 10B in the fifth embodiment.

The VLAN bundling table 18B comprises a plurality of entry groups EN60, EN70 and EN80 corresponding to the subscriber side physical lines (subscriber VLANs), respectively. The entry group EN60 for the subscriber L6VLAN and the entry group FN80 for the subscriber L8VLAN have the same ISP side line information 182.

FIG. 20 shows exemplary contents of a routing table provided in the ISP router 20 in the fifth embodiment.

Because one sub-network is separated into two lines L1 and L5 connected to the ISP router 20 in the fifth embodiment, the routing table 21 includes a table entry 200-3 in which different values of output line information 212 are defined for the same sub-network IP address (network destination/netmask) 211.

Figure 21:
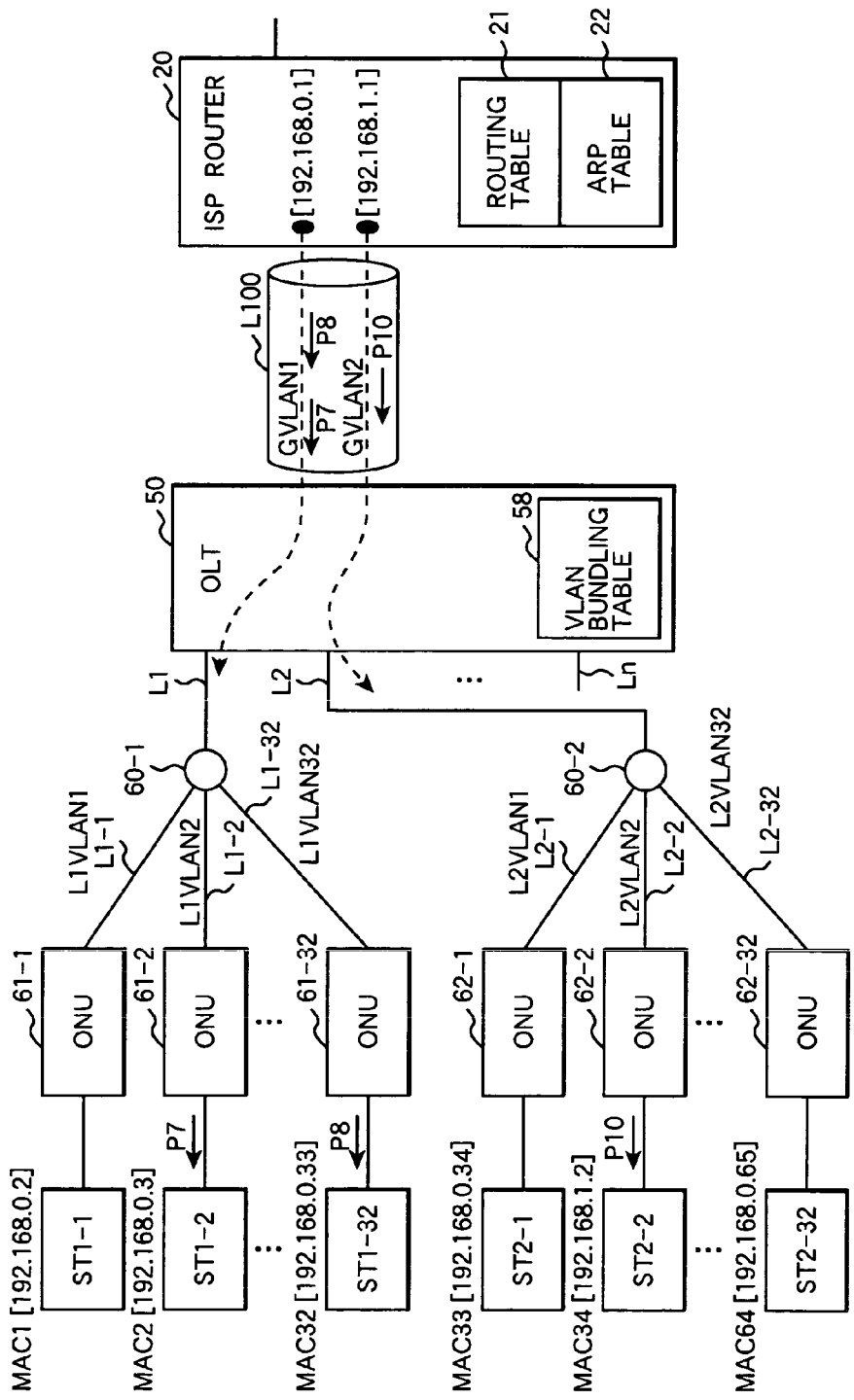
FIG. 21 schematizes one embodiment of an ISP network including a GE-PON system to which the present invention is applied.

FIG. 21 schematizes an ISP network including a Gigabit Ethernet-Passive Optical Network (GE-PON) system to which the present invention is applied, as a sixth embodiment of the present invention. Here, the VLAN bundling table in the L2SW described above is applied to an Optical Line Terminal (OLT) in the PON.

The PON system is configured such that an optical fiber L1 connected to the OLT 50 diverges through an optical coupler 60-1 into a plurality of branch optical fibers L1-1 to L1-32 and Optical Network Units (ONUs) 61 (61-1 to 61-32) as subscriber connection apparatuses are connected to the branch optical fibers, respectively. Other optical fibers L2 to Ln are connected to a plurality of ONUs as subscriber connection apparatuses, respectively, in the same manner. In FIG. 21, subscriber terminals ST1 (ST1-1 to ST1-32) are connected to the ONUs 61 (61-1 to 61-32) and subscriber terminals ST2 (ST2-1 to ST2-32) are connected to the ONUs 62 (62-1 to 62-32).

In the PON system, downstream IP packets from the OLT 50 toward the ONUs 61 (61) are transmitted through an optical fiber Li (i=1 to n) and broadcasted onto the branch optical fibers Li-1 to Li-32. Considering the Layer 2 of the GE-PON, the OLT 50 assigns different VLAN tags (VLAN IDs) to the ONUs individually and specifies the destination ONU of each frame by a VLAN tag attached to an Ethernet frame including an IP packet addressed to the subscriber terminal. In conventional PON systems, since the VLAN IDs assigned to the ONUs are passed over to the ISP router 20, there is posed a problem of an increasing number of table entries in the routing table to correlate an IP address with a VLAN ID on the ISP router 20.

The present embodiment is characterized in that the OLT 50 is provided with a VLAN bundling table 58 and the OLT 50 unifies a plurality of subscriber VLANs defined across the PON into one group VLAN by referring to the VLAN bundling table 58, thereby allowing communication of frames with fewer group VLAN IDs over a connection line L100 between the OLT 50 and the ISP router 20.

In FIG. 21, two group VLANs are defined on the line L100. A first group VLAN (GVLAN1) unifies a plurality of subscriber VLANs (L1VLAN1, L1VLAN2, L1VLAN3) being on an optical fiber L1 and a second group VLAN (GVLAN2) unifies a plurality of subscriber VLANs (L2VLAN1, L2VLAN2, L2VLAN3) being on an optical fiber L2. The ISP router 20 assigns a gateway IP address "192.168.0.1" to the first group VLAN: GVLAN1 and a gateway IP address "192.168.1.1" to the second group VLAN: GVLAN2.

For example, the ISP router 20 attaches an Ethernet header including an ID "GVLAN1" as a VLAN tag to an IP packet P7 addressed to a subscriber terminal ST1-2 connected to the optical fiber L1 and an IP packet P8 addressed to a subscriber terminal ST1-32 connected to the fiber L1, attaches an Ethernet header including an ID "GVLAN2" as a VLAN tag to an IP packet P10 addressed to a subscriber terminal ST2-2 connected to the optical fiber L2, and transmits these Ethernet frames to the line L100.

By referring to the VLAN bundling table 58, the OLT 50 converts the VLAN tag of a received frame including the IP packet P7 into a subscriber VLAN ID "L1VLAN2" and converts the VLAN tag of a received frame including the IP packet P8 into a subscriber VLAN ID "L1VLAN32", and forwards these frames to the optical fiber L1. A received frame including the IP packet P10 is forwarded to the optical fiber L2, after converting its VLAN tag into a subscriber VLAN ID "L2VLAN2". In this case, the frame including the IP packet P7 is received by an ONU 61-2 and the frame including the IP packet P8 is received by an ONU 61-32. The IP packets extracted from the received frames are forwarded to the subscriber terminals ST1-2 and ST1-32 corresponding to the destination IP addresses, respectively. The frame including the IP packet P10 is received by an ONU 62-2 and the IP packet extracted from the received frame is forwarded to the subscriber terminal ST2-2 corresponding to the destination IP address.

Figure 22:
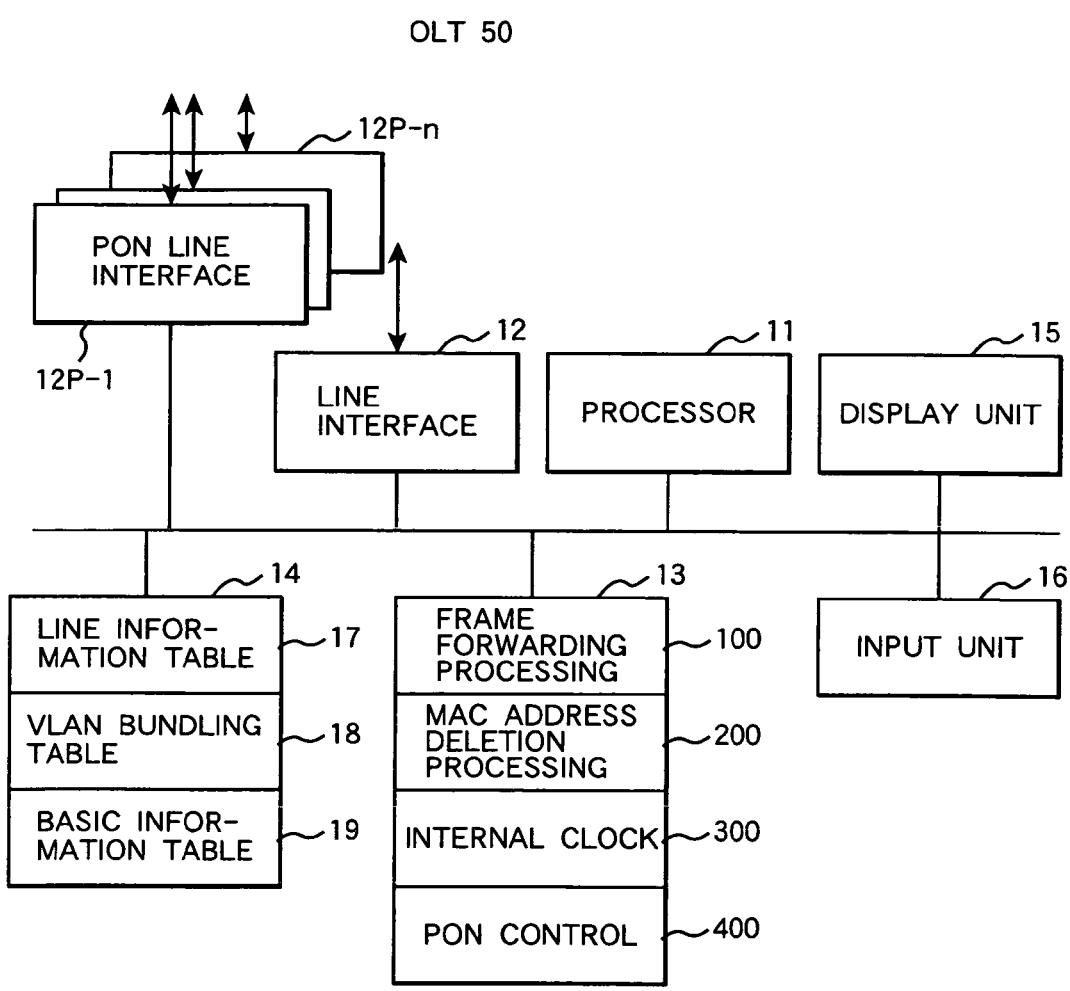
FIG. 22 is a block diagram showing a structure of an OLT 50 shown in FIG. 21.

FIG. 22 shows a structural block diagram of the OLT 50.

The OLT 50 comprises PON line interfaces 12P-i (i=1 to n) connected to optical fibers L (L1 to Ln), a line interface 12 connected to the connection line L100 for the ISP router 20, and other components which are similar to those in the frame forwarding apparatus (L2SW) shown in FIG. 2. A PON control routine is installed in the memory 13.

A PON line interface 12P-i is comprised of an upstream frame processing circuit which converts an optical signal received from a optical fiber Li into an electrical signal, terminates an upstream frame, and temporarily stores the frame into an upstream data buffer, a downstream frame processing circuit which edits downstream data into a predetermined format of a downstream PON frame, converts the PON frame into optical signals to transmit the frame to the optical fiber Li, and a PON control unit which allocates a time slot for data transmission to each ONU in accordance with control information extracted from each upstream PON frame and notifies each ONU of the allocated time slot, using a downstream PON frame.

The processor 11 processes upstream frames read out from the upstream data buffer of each PON line interface 12P-i and downstream frames read out from the line interface 12 and performs VLAN tag conversion in accordance with the frame forwarding processing routine 100.

FIG. 23 shows one embodiment of the VLAN bundling table 58 to be referred to by the processor 11 of the OLT 50 shown in FIG. 21 during the execution of the frame forwarding processing routine 100.

The VLAN bundling table 58 includes table entries EN1-1 to EN1-32 for GVLAN1, which correlate subscriber VLAN IDs "1" to "32" being on an optical fiber having a physical line number L1 with the group VLAN ID "1", and table entries EN2-1 to EN2-32 for GVLAN2, which correlate subscriber VLAN IDs "1" to "132" being on an optical fiber having a physical line number L2 with the group VLAN ID "2". Likewise, for subscriber VLAN IDs defined on the other optical fibers having physical line numbers L3 to Ln, table entries for correlating them with a group VLAN ID are also prepared, but such table entries are omitted here for simplifying purposes.

According to the present embodiment, since the number of VLAN IDs to be used between the OLT 50 and the ISP router 20 can be reduced, it is possible to simplify the structure of a routing table 21 for the ISP router 20, as is the case for the for going first to fifth embodiments. It is also possible to reduce the load of the ISP router for forwarding packets and to make effective use of the IP address range to be allocated to each sub-network.

What is claimed is:

1. A frame forwarding apparatus equipped with a plurality of line interfaces, connected to an IP packet forwarding apparatus through one of said line interfaces and connected to subscriber terminals through the other line interfaces, said frame forwarding apparatus comprising:

a line information table comprising a plurality of entries, each defining a line number of a physical line connected to one of said line interfaces and flag information for indicating whether the physical line is connected to said IP packet forwarding apparatus or to one of said subscriber terminals;

a VLAN bundling table comprising a plurality of entries, each defining the correspondence of subscriber side line information with IP packet forwarding apparatus side line information and subscriber terminal's MAC address; and a frame forwarding processing unit for controlling forwarding of frames each including a VLAN identifier, between each of said subscriber terminals and said IP packet forwarding apparatus, wherein each entry of said VLAN bundling table includes a physical line number and a subscriber VLAN identifier defined on the physical line having the physical line number as said subscriber side line information and a physical line number of the physical line connected to said IP packet forwarding apparatus and a group VLAN identifier defined on the physical line as said IP packet forwarding apparatus side line information, and at least one group of the entries in said VLAN bundling table includes the same group VLAN identifier as each other as said IP packet forwarding apparatus side line information, wherein when a frame is received through one of said line interfaces, said frame forwarding processing unit (1) judges whether the frame is received from one of said subscriber terminals or from said IP packet forwarding apparatus by referring to the flag information in said line information table based on the line number of the physical line connected to the one line interface; (2) converts, by referring to said VLAN bundling table, the subscriber VLAN identifier given in the frame into the group VLAN identifier defined in one of said entries when the frame is judged as one having been received from one of said subscriber terminals, and forwards the frame to said IP packet forwarding apparatus; and (3) converts a group VLAN identifier given in the frame into the subscriber VLAN identifier defined in one of said entries when the frame is judged as one having been received from said IP packet forwarding apparatus and addressing one of said subscriber terminals with a destination MAC address, and forwards the frame to one of said physical lines corresponding to the destination subscriber terminal through one of said line interfaces.

2. The frame forwarding apparatus according to claim 1, wherein said frame forwarding processing unit:

conducts a first search of said VLAN bundling table, when forwarding the frame received from one of said subscriber terminals, for an entry including the subscriber VLAN identifier given in the received frame as the subscriber side line information and converts the subscriber VLAN identifier of the received frame into the group VLAN identifier specified in an entry, search by the first search; and conducts a second search of said VLAN bundling table, when forwarding the frame received from said IP packet forwarding apparatus, for an entry having a MAC address matched with the destination MAC address of the received frame and converts the group VLAN identifier of the received frame into the subscriber VLAN identifier specified in an entry searched by the second search.

3. The frame forwarding apparatus according to claim 2, wherein said frame forwarding processing unit outputs the frame received from one of said subscriber terminals to one of said line interfaces corresponding to the physical line number specified by the IP packet forwarding apparatus side line information in the entry searched by the first search, and outputs the frame received from said IP packet forwarding apparatus to one of said line interfaces corresponding to physical line number specified by the subscriber side line information in the entry searched by the second search.

4. The frame forwarding apparatus according to claim 1, wherein all of said one group of entries having the same group VLAN identifier include the same physical line number and the same subscriber VLAN identifier to each other as said subscriber side line information.

5. The frame forwarding apparatus according to claim 1, wherein all of said one group of entries having the same group VLAN identifier include the same physical line number and different subscriber VLAN identifiers from each other as said subscriber side line information.

6. The frame forwarding apparatus according to claim 1, wherein the entries of said VLAN bundling table form a plurality of groups, each comprising a plurality of entries including the same physical line number as each other as said subscriber side line information, and the plurality of entries belonging to the same group include the same group VLAN identifier as each other as said IP packet forwarding apparatus side line information.

7. The frame forwarding apparatus according to claim 6, wherein at least one of said plurality of groups comprises a plurality of entries including the same physical line number and different subscriber VLAN identifiers as each other as said subscriber side line information and another group comprises a plurality of entries including the same physical line number and the same subscriber VLAN identifier as each other as said subscriber side line information.

8. The frame forwarding apparatus according to claim 1, wherein said frame forwarding processing unit searches said VLAN bundling table when a frame including a broadcast address as said destination MAC address was received from said IP packet forwarding apparatus, for a plurality of entries each having the group VLAN identifier matched with the group VLAN identifier given in the received frame, converts the received frame into a plurality of frames each having the subscriber VLAN identifier specified in each of searched entries, and selectively outputs each of the frames to one of said line interfaces corresponding to the physical line number specified a searched entry.

9. The frame forwarding apparatus according to claim 1, wherein a group of said other line interfaces connected to the subscriber terminals is provided with a function of terminating a Passive Optical Network (PON) frame and connected to a plurality of subscriber terminals via an optical fiber and branch fibers coupled to the optical fiber with an optical coupler.

* * * * *